United States Patent [19]

Okazaki

[11] Patent Number: 4,978,970
[45] Date of Patent: Dec. 18, 1990

[54] SCANNING/RECORDING SYSTEM WITH PLURAL BEAM OVERLAP WITHOUT INTERFERENCE

[75] Inventor: Masahide Okazaki, Kyoto, Japan

[73] Assignee: Dainippon Screen Mfg. Co., Ltd., Japan

[21] Appl. No.: 219,439

[22] Filed: Jul. 14, 1988

[30] Foreign Application Priority Data

| Jul. 17, 1987 | [JP] | Japan | 62-179631 |
| Jul. 22, 1987 | [JP] | Japan | 62-184299 |
| Jul. 22, 1987 | [JP] | Japan | 62-184300 |
| Jul. 22, 1987 | [JP] | Japan | 62-184301 |
| Mar. 17, 1988 | [JP] | Japan | 63-64889 |
| Mar. 18, 1988 | [JP] | Japan | 63-66067 |

[51] Int. Cl.⁵ .......................... G01D 15/14
[52] U.S. Cl. .................... 346/1.1; 346/108
[58] Field of Search .......... 346/108, 107 R, 76 L, 346/160, 1.1

[56] References Cited

U.S. PATENT DOCUMENTS

| 4,093,964 | 6/1978 | Aughton |  |
| 4,419,750 | 12/1983 | Howe | 346/76 L |
| 4,428,075 | 1/1984 | Hazel | 346/108 |

FOREIGN PATENT DOCUMENTS

| 118302 | 10/1977 | Japan . |
| 69701 | 6/1978 | Japan . |
| 60-203071 | 10/1985 | Japan . |

Primary Examiner—Mark J. Reinhart
Attorney, Agent, or Firm—Ostrolenk, Faber, Gerb & Soffen

[57] ABSTRACT

An uncomplicated system for exposing a recording medium by scanning the medium with laser light to form a clear, uniformly dense recording pattern without interference.

32 Claims, 11 Drawing Sheets

SCANNING/RECORDING SYSTEM WITH PLURAL BEAM OVERLAP WITHOUT INTERFERENCE

BACKGROUND OF THE INVENTION

1. Field of the Invention

The present invention relates to a method of laser exposure applied to an image recording apparatus such as a laser printer, a color scanner for reproduction, or a laser plotter for manufacturing printed circuit boards, and more specifically to a method of laser exposure in which a plurality of parallel laser recording beams scan an image recording surface.

2. Description of the Prior Art

FIG. 1 is a perspective view of a conventional laser plotter and FIG. 2 is a schematic block diagram of such laser plotter.

Referring to FIGS. 1 and 2, the laser plotter comprises a console unit 21, a data processing unit 23 for arithmetically processing data inputted through a recording medium such as a magnetic tape, a data converting unit 70 for converting the data processed in the data processing unit 23 into desired recording signals, and a recording unit 80 for scanning and recording images on a photosensitive film 83 on a recording drum 82 based on the recording signals. The plotter exposes and records a master pattern of high precision of a printed circuit board and the like at high speed and with high precision.

The laser plotter can be functionally divided into an image data forming unit 60, a data converting unit 70 and an image recording unit 80. The image data forming unit 60 forms vector data of the image based on CAD (Computer Aided Design) data. The image data forming unit comprises a minicomputer 61 for calculating vector data, a CRT 62, a keyboard 63, a magnetic tape 64 or magnetic disc 65 for storing CAD data, and the like. The data converting unit 70 converts the vector data formed in the image data forming unit to dot data for output. The image recording unit 80 records a binary image by zonally scanning a photosensitive material (which will be the image recording surface) with a plurality of multilaser beams, whether or not a particular beam is scanned on the recording surface is based on a plurality of dot data supplied from the data converting unit 70. The image recording unit 80 comprises a laser unit for emitting recording a laser, a recording drum 82 which is rotated with the photosensitive material 83 held thereon, a multichannel type modulator for separately outputting multiple laser beams, and the like.

In the above described apparatus, simultaneous recording is carried out by several beams, as follows: Beam spots are arranged adjacent to each other in an axial direction (subscanning direction) of the recording drum 82, whereby an image is formed in the axial direction. After the image is formed in the axial direction, the recording drum 82 is rotated in the peripheral direction (main scanning direction). The beams are formed in the subscanning direction based on the succeeding data. The above described operation is repeated to record the image.

However, if recording laser beams emitted from a single laser source overlap with each other, the recording beams are disturbed because of interference. Therefore, the prior art has sought to avoid overlapping the recording beams.

The distribution of light intensity of a laser beam emitted from a laser source is uneven. The intensity has a Gaussian distribution represented by the following equation (1), as shown in FIG. 3, for example.

$$I_y = I_0 \exp[-2(y/\omega)^2] \tag{1}$$

where
- $I_y$: power density
- $y$: distance from the center of the beam
- $\omega$: beam radius (where the power density becomes $1/e^2$ in association with the power density $I_0$ at the center)

As is apparent from the equation (1), the intensity of light becomes extremely low at the periphery of the beam.

If the laser beam has a Gaussian distribution, the beam spot diameter D ($=2\omega$) is defined as a beam diameter having the light intensity distribution of $1/e^2$ (about 13.5%) of the light intensity at the center of the laser beam.

The overlap of the beams is defined as the overlap of the beam spot diameters D.

Therefore, if the zonal scanning lines are successively exposed and recorded by a plurality of adjacent such recording beams, the density of the portion corresponding to the border between the two beams cannot be high and the resulting recording pattern will appear to be divided and will not have the desired even density.

Methods for eliminating such a disadvantage are disclosed in, for example, Japanese Patent Laying-Open Gazette No. 118302/1977, Japanese Patent Laying-Open Gazette No. 69701/1978, Japanese Patent Laying-Open Gazette No. 203071/1985.

FIG. 4 shows a method disclosed therein. A serial beam spot line B13 is arranged inclined by a prescribed angle from the scanning direction, so that portions of neighboring scanning lines overlap each other as they scan the photosensitive material with this method, the above described phenomenon in which the image appears divided can be eliminated.

However, since the serial beam spot line is arranged inclined from the scanning direction by a prescribed angle in the above described prior art, if the image signal output timings of respective recording beams are made equal, the resulting image is skewed according to the angle of inclination. Therefore, a delay circuit is necessary to control the timing of image output signals for each recording beam so that the resulting image is correctly aligned. The number of required delay circuits corresponds to the number of recording beams. This complicates the apparatus.

Furthermore, when the image recording surface is on a cylindrical surface of a rotary recording drum whose, the direction of the recording beam line B13 is diagonal to the axial direction of the recording drum 25 as is shown exaggerated in FIG. 4. Therefore, the shape of the beam (beam spot B14 of each recording beam) irradiated onto the cylindrical recording surface is distorted. Consequently, the light intensity distribution becomes uneven.

Another method for eliminating the above described disadvantages is disclosed in Japanese Patent Laying-Open Gazette No. 203071/1985.

A plurality of laser recording beams are transmitted through glass fibers and the beam output ends of the glass fibers are arranged in a staggered manner so as to form a staggered beam spot line on the image recording surface, whereby portions of neighboring scanning lines overlap each other.

However, when a plurality of laser beams are transmitted through glass fibers, the above described prior art creates the following problems.

Generally, a beam emitted from the beam output end of a glass fiber has a large angle of divergence (25°~120°) (very large relative to the angle of divergence of a common laser beam which is about 1 m rad). Thus, the loss of energy of a recording beam emitted from a glass fiber is great. In order to eliminate this problem, a collimator lens may be provided at the beam output end of each glass fiber. However, this makes the structure quite complicated and presents other practical difficulties and disadvantages.

SUMMARY OF THE INVENTION

Therefore, one object of the present invention is to provide a method of and an apparatus for forming a clear recording pattern by laser exposure.

Another object of the present invention is to provide a method of and an apparatus for forming a recording pattern of uniform density by laser exposure.

A further object of the present invention is to provide a method of and an apparatus for recording a pattern which is not divided.

A still further object of the present invention is to provide a laser exposure apparatus which is capable of forming a recording pattern of uniform density at lower expense.

A still further object of the present invention is to provide a method of and an apparatus for laser exposure employing lights forming a pair of orthogonal polarization.

A still further object of the present invention is to provide a method of and an apparatus for forming a smooth recording pattern by laser exposure.

The above described objects of the present invention can be attained by an apparatus for exposing a recording medium. The apparatus includes means for forming laser beams which do not interfere with each other even if overlapped; means for independently modulating the laser beams; means for synthesizing the laser beams to form a synthesized beam; an optical system for projecting the synthesized beam onto a recording medium to form a line; and means for scanning the synthesized beam across the recording medium in a direction which is orthogonal to the line.

Since the laser exposure apparatus comprises the above described components, a plurality of beam spot lines can be arbitrarily arranged to be projected on the recording medium. Therefore, a plurality of beam spot lines can be overlapped with each other (by properly controlling the arrangement thereof) so that the light intensity between beam spots is not reduced. Therefore, a laser exposure apparatus can be provided which is capable of forming a clear recording pattern.

According to a preferred embodiment of the present invention, the beam synthesizing means comprises a beam synthesizing means for synthesizing at least two laser beams so that portions thereof overlap with each other.

Since the exposure apparatus comprises the above described component, the laser beams can be overlapped with each other. Therefore, there will be no such reduced intensity portion between beams. Consequently, a laser exposure apparatus can be provided which is capable of forming a recording uniformly dense pattern.

According to a preferred embodiment of the present invention, at least two laser beams which do not interfere with each other even when overlapped with each other are prepared. A laser beam are irradiated from a single light source and divided into at least two laser beams.

Since the laser exposure apparatus comprises the above described component, only a single laser source is required. Consequently, a laser exposure apparatus can be provided in which a recording pattern of uniform density can be formed at low expense.

According to a more preferred embodiment of the present invention, the means for preventing interference of laser beams comprises means for converting beams to form a pair of beams which are orthogonally polarized with respect to each other.

Since the laser exposure apparatus comprises the above described component, two laser beams which do not interfere other even when overlapped with each can be readily prepared. Therefore, a laser exposure apparatus with a simple structure can be provided which is capable of forming a uniformly dense recording pattern.

According to a further embodiment of the present invention, the means for preventing interference between laser beams comprises means for causing the lengths of two optical paths to be longer than the coherence length of the laser light.

Since the laser exposure apparatus comprises the above described component, a laser exposure apparatus can be provided which is capable of forming a uniformly dense recording pattern without employing a polarizing apparatus.

In another preferred embodiment of the present invention, the beam synthesizing means comprises a polarizing beamsplitter. The polarizing beamsplitter transmits approximately 100% of a prescribed polarized light. Therefore, laser beam loss can be minimized.

Another preferred embodiment of the present invention is directed to a method of irradiating a plurality of laser recording beams onto an image recording surface to form a serial beam spot line and scanning beams in a main scanning direction to expose the recording medium, the method comprises the steps of:

forming two laser beams which do not interfere with each other even when overlapped, each of the beam having a plurality of beam spot lines; modulating separately at least two laser beams; aligning respective serial beam spot lines of at least two laser beams in the said line direction such that portions overlap each other; and exposing the said recording medium by using the aligned beam spot lines.

Since the method for laser exposure comprises the above described steps, the recording medium is irradiated by laser beams with overlap of each other. Therefore, there will be no portion of lower light intensity between beams. Consequently, a method of laser exposure capable of forming a uniformly dense recording pattern can be provided.

These objects and other objects, features, aspects and advantages of the present invention will become more apparent from the following detailed description of the preferred embodiments when taken in conjunction with the accompanying drawings.

DESCRIPTION OF THE PREFERRED EMBODIMENTS

Figure 1:
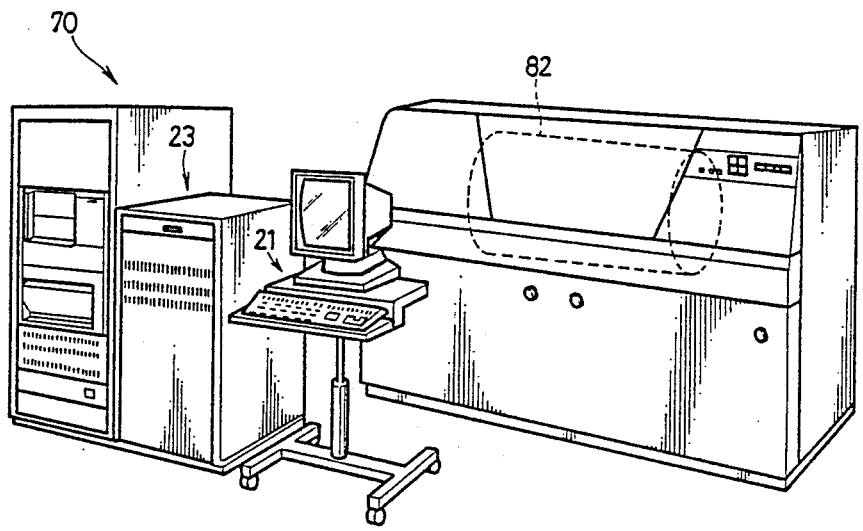
FIG. 1 is a perspective view showing a conventional laser plotter.
Figure 2:
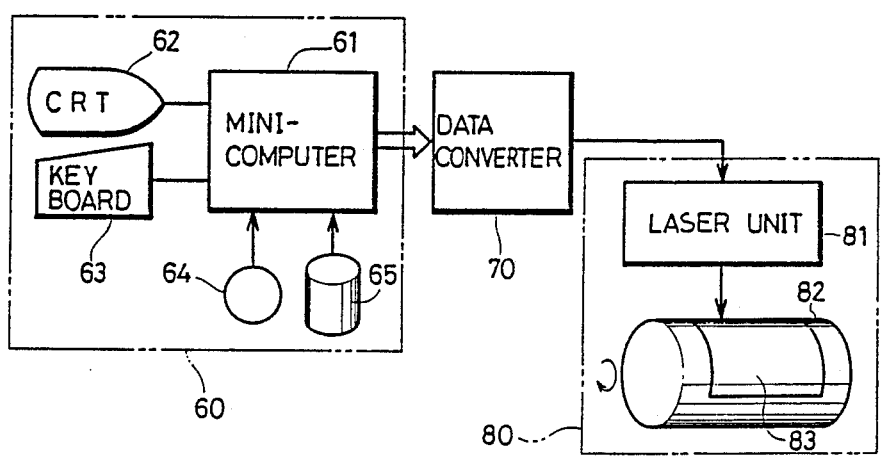
FIG. 2 is a schematic block diagram of the laser plotter shown in FIG. 1.

Since the present invention relates to an exposure apparatus utilizing laser beams, the embodiment will be described using the laser plotter shown in FIGS. 1 and 2.

Embodiment 1

First, an embodiment in which the apparatus utilizes a pair of orthogonally polarized laser beams will be described.

Prior to the description of the embodiment, orthogonal polarization will be explained.

The state of polarization of light is defined by the state of the locus of the oscillation vector of light (in the case of laser beams, normally the electric vector). The locus is generally represented by an ellipse having the following parameters.

(1) Azimuth of an ellipse major axis $\theta[0° \leq \theta < 180°]$

An angle of the major axis between an ellipse and a certain reference axis.

(2) Ellipticity angle $\beta[-45° \leq \beta \leq 45°]$

An angle whose tangent is the proportion of the major axis 1 and the minor axis m of an ellipse. That is, $\beta = \pm \tan^{-1} m/l$. The positive and negative signs of the ellipticity angle $\beta$ represents handedness, (right-handed elliptically polarized light being positive and left-handed elliptically polarized light being (negative).

The above described parameters can be used to describe elliptically polarized light. If $\beta = \pm 45°$, the locus of the oscillation vector of the light is a circle. This state is called circular polarization. If $\beta = 0°$, the locus of the oscillation vector of the light is a line. This state is called linear polarization.

Figure 5:
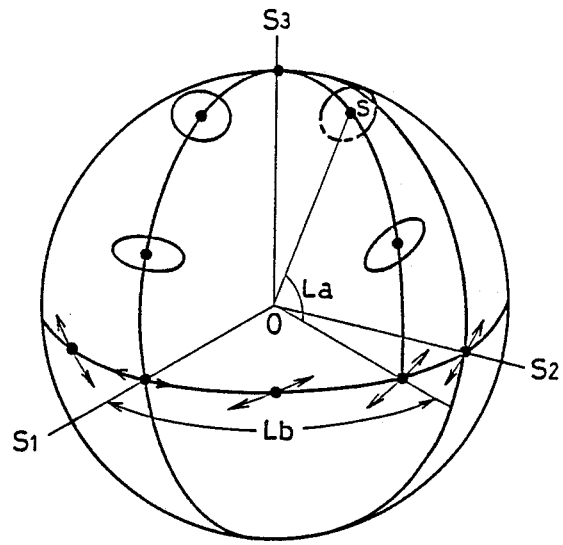
FIG. 5 shows a Poincare sphere illustrating the state of polarized light.

The Poincaré sphere representation shown in FIG. 5 is generally used as a model for representing the above described state of polarized light. (For example, "Kessho Kogaku (crystal optics)" by Optics Division, the Japan Society of Applied Physics, published by Morikita Shuppan Inc. on Aug. 27, 1984, page 146 and in "Kogaku (optics)" by Kozo Ishiguro, published by Kyoritsu Shuppan Inc. on Feb. 15, 1980, page 20). According to the Poincaré sphere representation, each point on the surface of a sphere or globe corresponds to a specified state of polarized light. The latitude La of an arbitrary point S shown in FIG. 5 represents twice the ellipticity angle $\beta$ while the longitude Lb thereof represents twice the azimuth of an ellipse major axis $\theta$. In the Poincaré sphere representation, right-handed polarized light (positive ellipticity angle) is in the northern hemisphere, while left-handed polarized light (negative ellipticity angle) is in the southern hemisphere. Linear polarized light (ellipticity angle $\beta = 0$) is arranged on the equator. Right-handed circularly polarized light and left-handed circularly polarized light are arranged on the poles.

Two polarized lights are called orthogonally polarized when the difference of the azimuth of their ellipse major axes is 90°, the absolute value of the ellipticity angle of each polarized light is equal to each other and the signs thereof, that is, their handedness, is opposite to each other. According to the Poincaré sphere representation, orthogonal polarization is denoted by a pair of polarized lights arranged on positions where the difference of the longitude is 180° and the absolute value of the latitude is the same with the signs opposed to each other. Therefore, in the Poincaré sphere representation, two polarized lights positioned in point symmetry about the point 0 constitute an orthogonally polarized pair. In elliptically polarized light, the pair with orthogonal polarization is a pair of two elliptically polarized lights having their major axes intersecting orthogonally with each other, the proportion of the major axis 1 and the minor axis m being equal to each other, and with opposite handedness. Circularly polarized light is orthogonally polarized when a pair has opposite handedness. Linearly polarized light is orthogonally polarized when a pair has planes of polarization intersecting orthogonally to each other.

Laser beams consist of coherent light orthogonally polarized coherent light beams do not interfere with each other even when they overlap each other.

Embodiment 1—1

Figure 6:
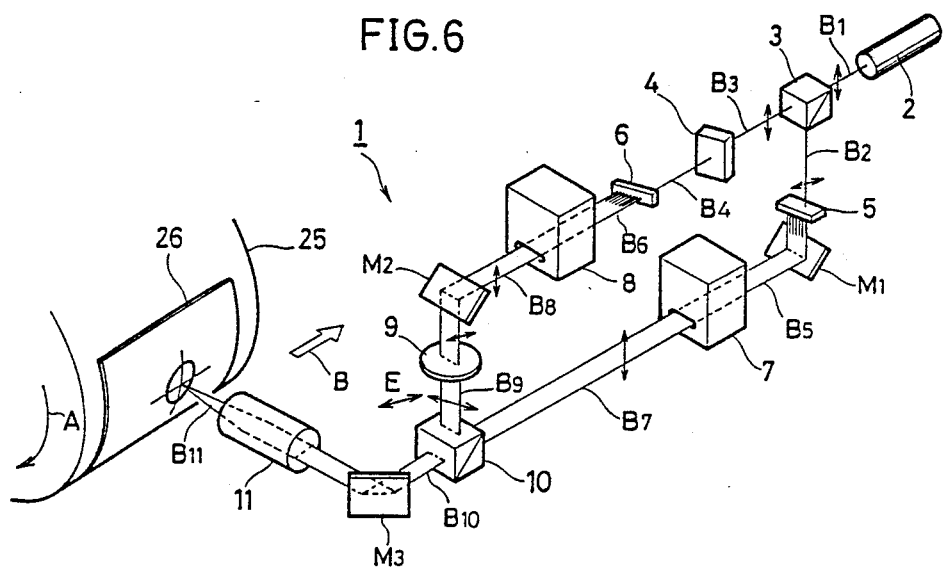
FIG. 6 is a perspective view of a laser exposure apparatus employing a pair of orthogonal polarization.
Figure 7:
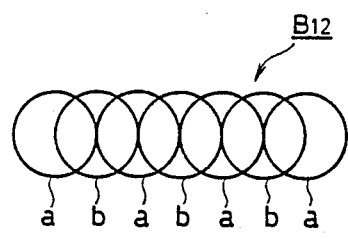
FIG. 7 shows the state of alignment of the beams.

FIG. 6 is a perspective view of a laser exposure apparatus 1 utilizing laser beams having planes of polarization which orthogonally intersect each other i.e., they are orthogonally polarized. The laser exposure apparatus 1 comprises a laser light source 2, a beamsplitter 3 for splitting a laser beam, a beam shifter 4 for shifting the laser beam by a prescribed amount, multitype beamsplitters 5, 6 for splitting beams, multichannel type light modulators 7, 8 for modulating recording beams, a half-wave retardation plate 9 for preventing disturbance, a beam synthesizer 10 for aligning beams, and a beam reducing optical system 11 for reducing beams for recording. The laser beam is irradiated in the axial direction of the recording drum 25 on which the images are recorded, and a serial beam spot line B12 such as shown in FIG. 7 is formed on a photosensitive film 26 attached on the recording drum 25. In FIG. 6, M1 to M3 denote mirrors.

The laser light source 2 comprises an argon helium, or neon laser, a laser diode, or the like, which emits a linearly polarized light beam B1.

The beamsplitter 3 divides the light beam B1 into an oriented beam B2 and a straight beam B3. The multitype beamsplitters 5·6 divide the beams B2·B4 into a plurality of parallel beam lines B5·B6. The multitype beamsplitters 5·6 are disclosed in, for example, Japanese Patent Laying-Open Gazette No. 122135/1977 and in Japanese Patent Laying-Open Gazette No. 19101/1985. The multitype beamsplitters 5 and 6 divide a single incidental beam into a plurality of parallel beams utilizing multiple internal reflections of a glass plate having parallel planes. One plane of the glass plate is coated to form a perfect reflective surface and the other plane is coated such that the transmittance gradually changes. By doing so, the quantity of light of each of the parallel beam lines B5 and B6 is approximately uniform.

The multichannel type light modulators 7 and 8 are provided for independently modulating each of the beams in the parallel beam lines B5 and B6 for emitting recording beam lines B7 and B8 for image recording. An acoustic optical modulator, an electro-optic modulator or the like are used as the light modulator. The multichannel type acoustic optical modulators 7 and 8 are disclosed in, for example, Japanese Patent Laying-Open Gazette No. 10742/1983 and in Japanese Patent Laying-Open Gazette No. 14135/1983, in which a plurality of acoustic transducers are attached onto a single acoustic optical medium. The parallel beam lines B5 and B6 irradiate the acoustic optical medium portion corresponding to the said acoustic transducer. Each of the incidental laser beams is independently modulated based on control signals generated in accordance with pattern signals so as to be emitted as parallel recording beam lines B7 and B8.

The beam synthesizer 10 receives the recording beam lines B7 and B9 from two directions intersecting orthogonally with each other, and aligns the directions thereof to emit a recording beam line B10. A common beamsplitter is arranged reversely to synthesize the beams. The beam lines are synthesized such that the beams belonging to the beam lines B7 and B9 are aligned with each other (the beams belonging to the lines B7 and B4 are arranged to be adjacent to each other successively).

The recording beam line B10 synthesized by the beam synthesizer 10 is reduced by a beam reducing optical system, and irradiates the surface of a photosensitive film 26 mounted on the recording drum 25. Consequently, a serial beam spot line B12 such as shown in FIG. 7 is formed.

The beam spot line B12 is formed by shifting adjacent beam spots a and b by one half of the spot diameter D using the said beam shifter 4 and by aligning the adjacent beam spots a and b in a subscanning direction (arrow B in FIG. 6) which intersects orthogonally with the main scanning direction (arrow A in FIG. 6) by the said beam synthesizer 10.

Figure 9:
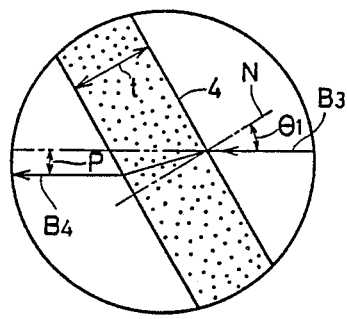
FIG. 9 shows a function of a beam shifter.

The said beam shifter 4 comprises transparent parallel flat plates such as shown in FIG. 9. By setting the angle $\theta_1$ formed by the normal N of the plane of the parallel flat plate and the laser beam B3 at an angle defined by the following equation, the emitted light B4 is shifted in parallel by a desired pitch P (here the distance necessary to shift the beam spot line by D/2).

$$P = t \cdot (1 - \cos\theta_1 / \sqrt{n^2 - \sin^2\theta_1}) \cdot \sin\theta_1$$

where
t: thickness of the parallel flat plate 4
n: refractive index of the parallel flat plate 4

The half-wave retardation plate 9 is provided to prevent disturbance of the recording beam caused by interference between the overlapped beam spots a and b of the beam spot line B12 shown in FIG. 7. The half-wave retardation plate 9 emits a recording beam line B9 in which the plane of polarization of each laser beam in one recording beam line B8 is rotated approximately 90° with respect to the plane of polarization of laser beam in the other recording beam line B7.

The half-wave retardation plate 9 converts an arbitrary polarized light on the Poincaré sphere shown in FIG. 5 into a polarized light placed at a position rotated by 180° about an axis passing through the equator and the point 0. The central axis is determined by the rotary position of the half-wave retardation plate 9. Therefore, by adjusting the rotary position of the half-wave retardation plate 9, an arbitrary polarized light on the Poincaré sphere can be converted into a polarized light on a position of point symmetry about the point 0. Therefore, by adjusting the rotary position of the half-wave retardation plate 9, the linearly polarized light positioned on the equator of the Poincaré sphere can be converted into a linearly polarized light on the point of symmetry about the point 0, namely, the linearly polarized light with the plane of polarization intersecting orthogonally with the linearly polarized light.

Figure 8:
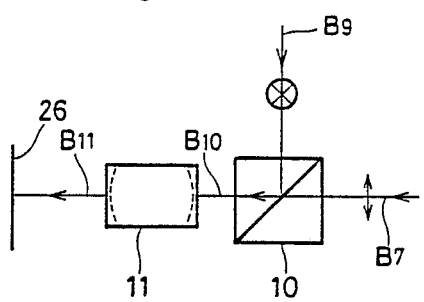
FIG. 8 shows a beam synthesizer.

The mark $\updownarrow$ appended to the beams B1 to B9 show the planes of polarization of the beams of linearly polarized light. The mark $\otimes$ shown in FIG. 8 shows that the plane of polarization of the beam is perpendicular to the surface of the sheet. These marks are used similarly in the other figures.

Figure 10:
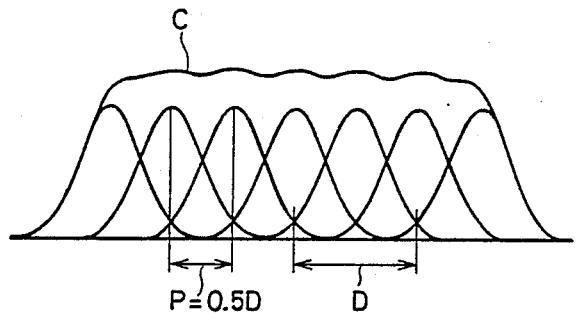
FIG. 10 shows a distribution of light intensity of a beam spot line.

Therefore, according to the above described structure, the planes of polarization of the adjacent recording beams are orthogonal to each other and therefore no interference occurs. Therefore, adjacent recording beams may overlap without creating interference. When zonal scanning lines are recorded by utilizing the beam spot line B12 in which one half of the beam diameter D of the beams overlap each other, the distribution of light intensity will be as flat as the solid line C in FIG. 10.

Figure 11:
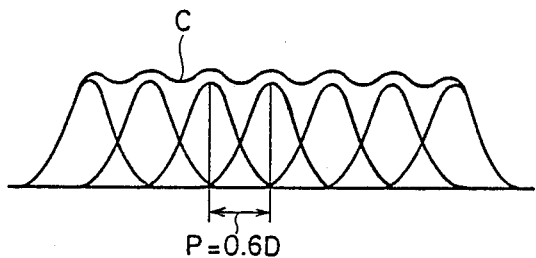
FIG. 11 shows the distribution of the light intensity of the spot line when the interval between the beam spot lines is wide.

Solid line C in FIG. 11 illustrates the distribution of light intensity when the beam diameter D and the pitch P between the adjacent beam spots are selected so that P=0.6 D. In this case also, generation of a dark portion can be prevented by selecting a photosensitive film having a high γ value.

The beam synthesizer 10 may be used such that recording beam lines B7 and B9 enter from two directions which do not form a right angle with each other and the serial beam spot line B12 is formed on the recording surface through the beam reducing optical system 11.

Figure 12A:
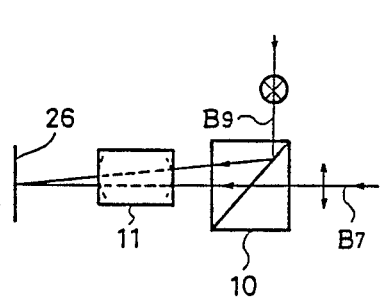
FIGS. 12A and 12B show modifications of the beam synthesizer.
Figure 12B:
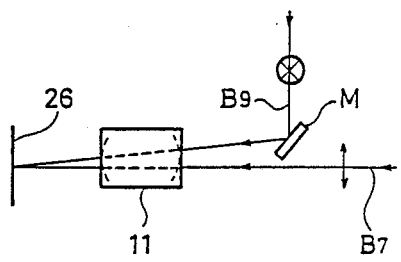

The serial beam spot line B12 may be formed by using an optical system comprising a mirror M such as shown in FIG. 12B as a beam synthesizing means instead of the beam synthesizer 10.

Embodiment 1-2

Figure 13:
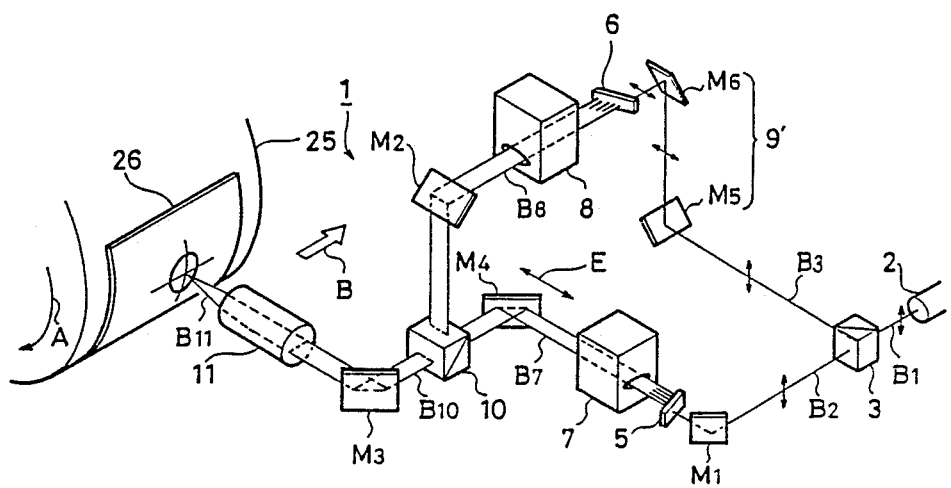
FIG. 13 shows the structure of a second embodiment.

FIG. 13 corresponds to FIG. 6, showing an apparatus in accordance with another embodiment of the present invention. The apparatus of this embodiment differs from the first embodiment as follows: a mirror M4 is provided instead of the beam shifter 4. The mirror M4 is finely adjustable in the direction of the arrow E. Furthermore, a means 9' for forming orthogonally intersecting planes of polarization comprising two mirrors M5 and M6 is provided instead of the half-wave retardation plate 9.

The mirror M4 is moved and adjusted by a desired pitch P in the direction of the arrow E. Consequently, one recording beam B7 which is reflected at a right angle at the mirror M4 to enter the beam synthesizer 10 is shifted from the other recording beam line B8 by a desired pitch P while they are aligned with each other.

The beams B2 and B3 are divided by the beamsplitter 3. That is, the beamsplitter 3 forms two beams of parallel linearly polarized light. One beam B3 is reflected into a different plane through the means 9' to form two beams having orthogonally intersecting planes of polarization. The means 9' of two mirrors M5 and M6. Consequently, the plane of polarization thereof intersects orthogonally with the plane of polarization of the other beam B2.

Figure 14:
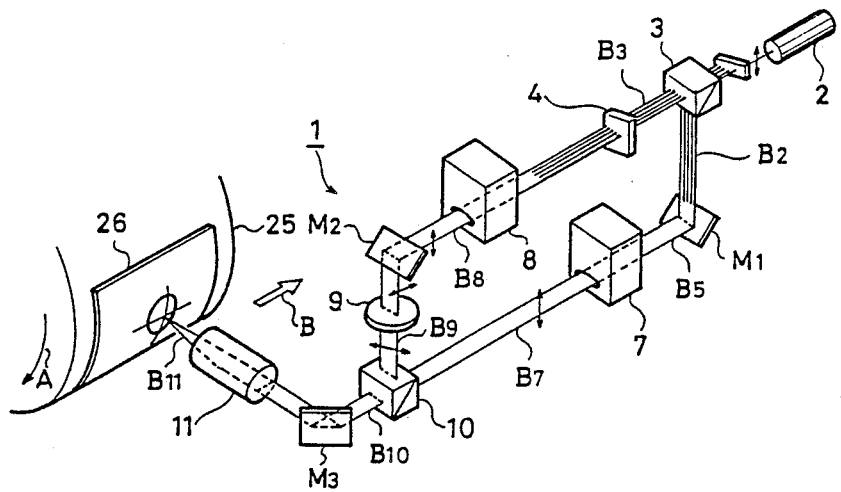
FIGS. 14 and 15 show modifications of the second embodiment.
Figure 15:
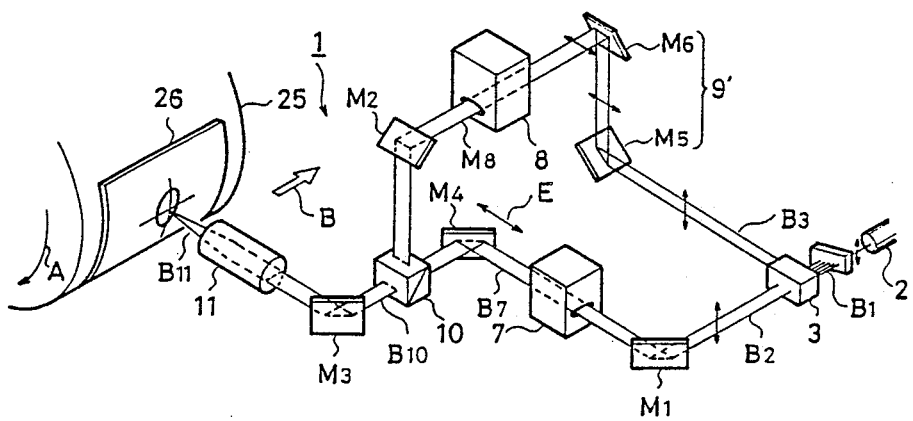

In the above described two embodiments, instead of arranging the multitype beamsplitters 5 and 6 at the positions shown in FIG. 6 or 13, one multitype beamsplitter may be arranged between the beamsplitter 3 and the laser source 2 as shown in FIGS. 14 and 15.

Although the foregoing description a case in which one plane of polarization of the overlapping recording beams is in the main scanning direction and the other plane of polarization is in the subscanning direction, the intersecting planes of polarization may be respectively inclined by 45° from the main scanning direction (or the subscanning direction), respectively. Various beamsplitters such as a beamsplitter, a half mirror, a Pellicle beamsplitter and the like may be used as the beams synthesizer 10. In particular, a polarizing beamsplitter is preferred.

A multilayer dielectric coating is applied on an inclined surface in the polarizing beamsplitter. When the beam B7 which is P polarized light is irradiated on such a surface, approximately 98% thereof is transmitted. If the beam B9 which is S polarized light is irradiated on the surface, approximately 98% thereof is reflected. The P polarized light denotes a polarized light whose plane of polarization is parallel to an arbitrarily determined plane while S polarized light is orthogonal to the P polarized light.

Even if the P polarized beam and S polarized beam enter the polarizing beamsplitter with the planes of polarization not accurately intersecting orthogonally with each other, the P polarized beam transmitted through the inclined surface having the multilayer dielectric coating and the S polarized beam reflected therefrom are emitted with accurate planes of polarization, respectively. Therefore, the planes of polarization of both resulting beams precisely intersect orthogonally to each other.

Therefore, by employing the polarizing beamsplitter, a mechanism for adjusting angles for accurately intersecting the planes of polarization orthogonally to each other can be eliminated, and the loss of energy in synthesizing laser beams can be greatly reduced.

Prisms employing double refracting crystal such as a Rochon prism can be used in the similar manner as the polarizing beamsplitter.

Embodiment 1-3

Light beams of linearly polarized light having planes of polarization which intersect orthogonally to each other are used in the above-described embodiments. Alternately, orthogonally polarized beams of circularly or elliptically polarized light may be utilized.

Figure 16:
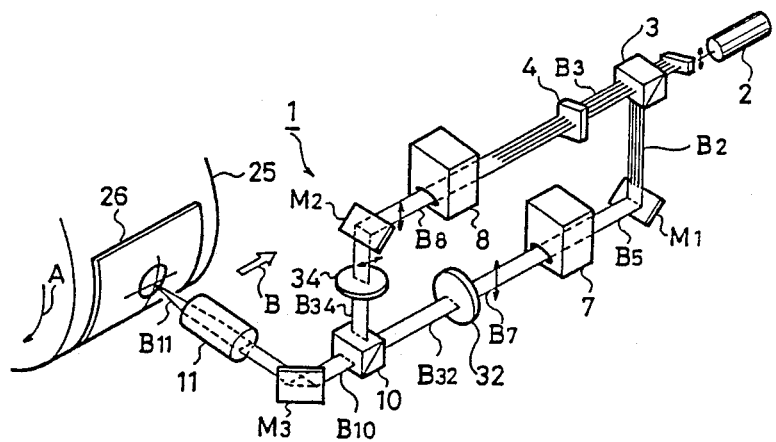
FIGS. 16 to 20 show embodiments employing pairs of orthogonal polarization of circularly polarized light or elliptically polarized light.

The apparatus shown in FIG. 16 is a modification of the apparatus of the embodiment shown in FIG. 14. The half-wave retardation plate 9 is eliminated and quarter-wave retardation plates 32 and 34 are provided between the multichannel type light modulators 7 and 8 and the beam synthesizer 10 for converting the linearly polarized beams B7 and B8 into circularly polarized beams B32 and B34 which are orthogonally polarized.

The quarter-wave retardation plates 32 and 34 convert an arbitrarily polarized light on the Poincaré sphere surface shown in FIG. 5 into polarized light arranged at a position rotated by 90° about an axis passing through the equator and the point 0. The central axis is determined by the rotary position of the quarter-wave retardation plates 32 and 34. Therefore, by adjusting the rotary position of the quarter-wave retardation plate 32 and 34, all linearly polarized light placed on the equator of the Poincaré sphere can be converted either to right-handed circularly polarized light or left-handed circularly polarized light positioned on each of the poles of the Poincaré sphere.

In the apparatus of this embodiment, the beam B7 modulated by the modulator 7 is converted into a right-handed circularly polarized light beam B32 by the quarter-wave retardation plate 32 and the beam B8 modulated by the modulator 8 is converted into a left-handed circularly polarized light beam B34 by the quarter-wave retardation plate 34. The beams B32 and B34 are synthesized by the synthesizer 10. Thus, since the right-handed circularly polarized light beam B32 and the left-handed circularly polarized light beam B34 are orthogonally polarized, there will be no interference between the two even when they overlap. Of course, either beam can be the right-handed circularly polarized light with the other beam being left-handed circularly polarized.

Figure 17:
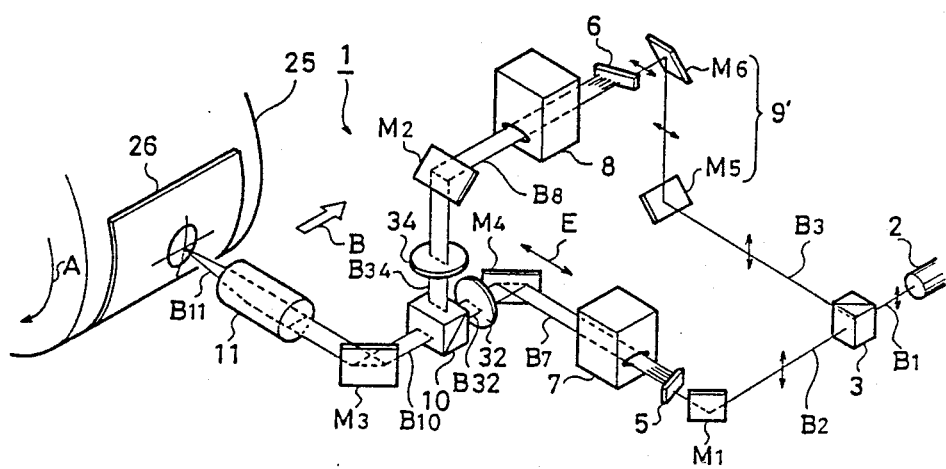

The apparatus shown in FIG. 17 is a modification of the apparatus shown in FIG. 13. The apparatus shown in FIG. 17 comprises quarter-wave retardation plates 32 and 34 provided between the light modulators 7 and 8 and the beam synthesizer 10. As in the apparatus shown in FIG. 16, the circularly polarized light beams B32 and B34 have opposite handedness and therefor can be overlapped without interference.

In this apparatus of the embodiment, the planes of polarization of the beams B7 and B8 irradiating the quarter-wave retardation plates 32 and 34 orthogonally intersect each other, so that the beams B32 and B34 may be elliptically polarized lights which are of orthogonally polarized. That is, in the Poincaré sphere representation, two polarized lights arranged on positions point symmetry about the point 0 on the equator will be the right-handed circularly polarized light and left-handed circularly polarized light if they are respectively rotated by 90° about an axis passing through the point 0 and orthogonal to the axis connecting the two polarizations, by two quarter-wave retardation plates 32 and 34 one in the direction toward the North Pole and the other in the direction toward the South Pole. If they are rotated in the direction to the North Pole and to the South Pole, respectively, by 90° about another axis passing through the equator and the point 0, they will be two elliptically polarized lights which are orthogonally polarized.

Figure 18:
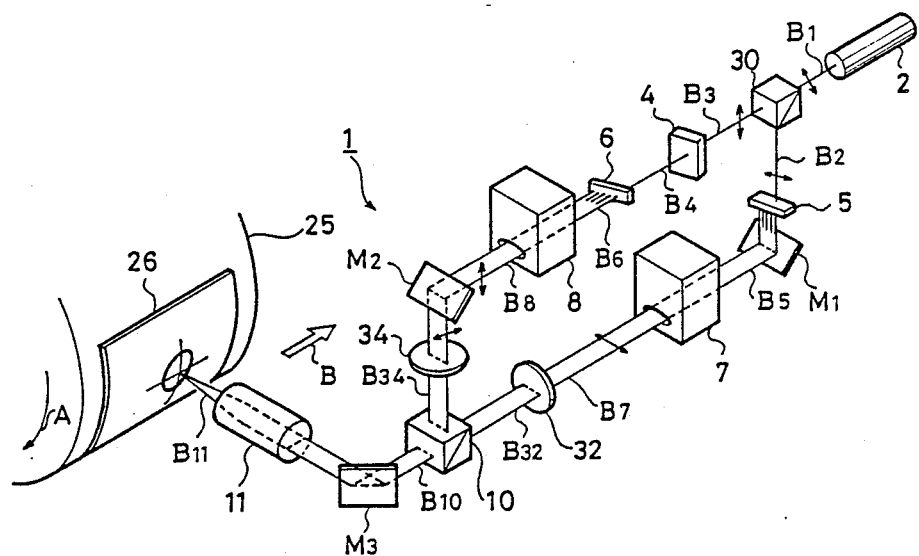

The apparatus shown in FIG. 18 is similar to the apparatus shown in FIG. 17. Linearly polarized light beams B7 and B8 with their planes of polarization being orthogonal to each other irradiate the quarter-wave retardation plates 32 and 34, and are converted into circularly or elliptically polarized light beams B32 and B34, which are orthogonally polarized. The manner of generating the beams B7 and B8 having planes of polarization which are orthogonal to each other is different from that in the embodiment shown in FIG. 17. More specifically, in the apparatus in shown in FIG. 18, a polarizing beamsplitter 30 is used as the beamsplitter and, in addition, the rotary position of the laser source 2 is adjusted beforehand so that the beam B1 irradiates the polarizing beamsplitter 30 with the plane of polarization thereof inclined by 45° with respect to the reference plane. Consequently, the beam B1 is separated into an S polarized beam B2 and a P polarized beam B3 with planes of polarization which are orthogonal to each other without loss of light intensity by the polarizing beamsplitter 30. Therefore, the planes of polarization of the beams B7 and B8 irradiating the quarter-wave retardation plate 32 and 34 orthogonally intersect each other as in the apparatus shown in FIG. 17.

In the apparatus of FIG. 18, if the quarter-wave retardation plates 32 and 34 are omitted, linear polarized lights having planes of polarization which orthogonally intersect each other can be provided as in the embodiment shown in FIG. 6.

Figure 19:
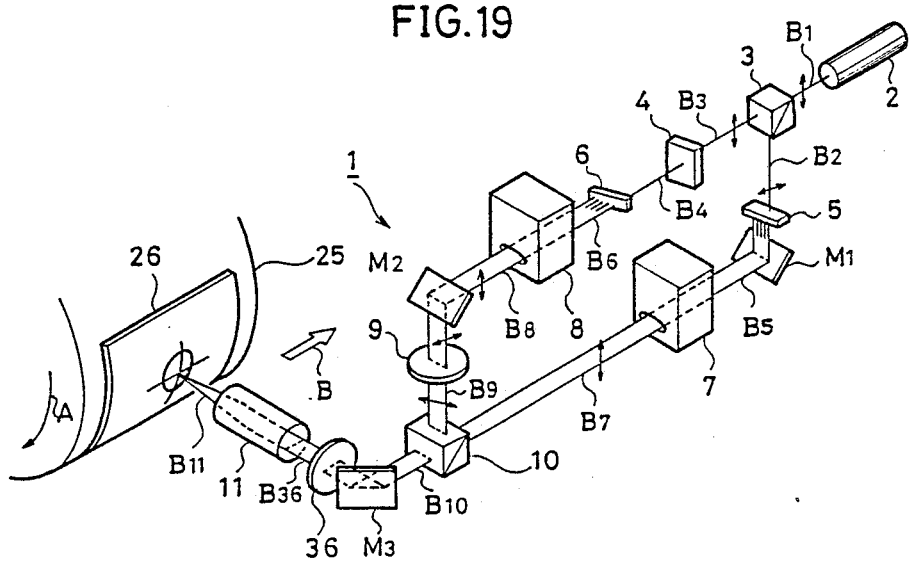

FIG. 19 shows a modification of the apparatus shown in FIG. 16, in which a quarter-wave retardation plate 36 is provided between the beam synthesizer 10 and the beam reducing optical system 11. In the apparatus of FIG. 19, the overlapping beams of the beam B10 emitted from the beam synthesizer 10 have their planes of polarization intersecting orthogonally to each other. Therefore, the beam B10 can be converted into a beam B36 of circularly polarized light or elliptically polarized light by a single quarter-wave retardation plate 36.

That is, in the Poincaré representaion, if two polarized lights arranged on positions in point symmetry about the point 0 on the equator are rotated by 90° about an axis passing through the point 0 and crossing orthogonally to an axis connecting two lights by a single quarter-wave retardation plate 36, these polarized lights become a right-handed circularly polarized light and a left-handed circularly polarized light. If they are rotated by 90° about another axis passing through the equator in the point 0, they will be two elliptically polarized lights.

Different from the apparatus shown in FIGS. 16 to 18, the loss intensity light can be reduced by employing a polarizing beamsplitter as the beam synthesizer 10 in the apparatus of FIG. 19.

Figure 20:
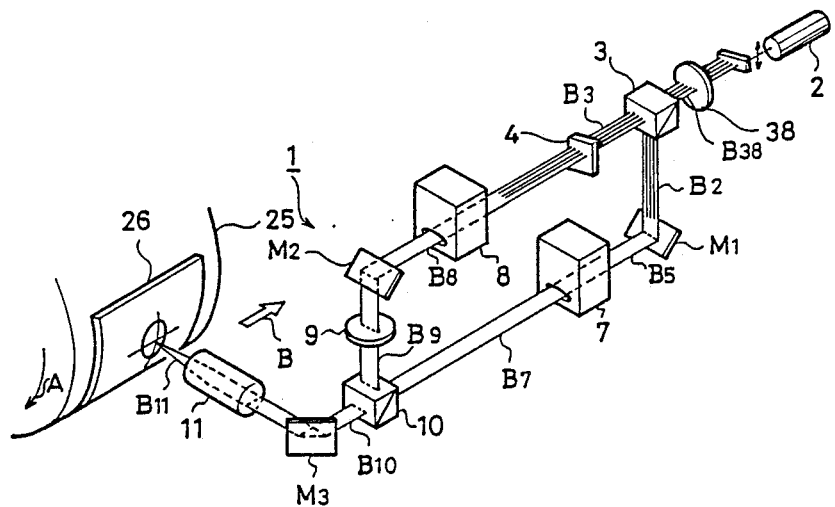

FIG. 20 shows a modification of the apparatus shown in FIG. 14 in which a quarter-wave retardation plate 38 is provided in front of the beamsplitter 3. In the apparatus of FIG. 20, the beam from the laser source 2 is converted into circularly polarized light or elliptically polarized light by the quarter-wave retardation plate 38. Thereafter, the beam is splitted by the beamsplitter 3 to provide beams B7 and B8 having the same state of polarization. A half-wave retardation plate 9 is adjusted so that one beam B8 is converted into a circularly polarized light or elliptically polarized light at the position of point symmetry in the Poincaré sphere. Therefore, a beam B9 which is orthogonally polarized with respect to the beam B7 can be provided.

A laser source emitting a laser beam having a prescribed state of polarized light generally emits only linearly polarized light. Therefore, in the above described embodiments, the laser beams emitted from the laser light source are described linearly polarized lights. However, if a laser light source capable of emittimg circularly or elliptically polarized light is used, the quarter-wave retardation plate 38 shown in the embodiment of FIG. 20, for example, can be omitted.

Embodiment 2

In a second embodiment of the present invention, an apparatus employs a laser beams which follow optical paths which have a difference in length which is greater than the coherence length. Description of features which are the same as, or which correspond to portions of the above described embodiments will be omitted appropriately.

Figure 21:
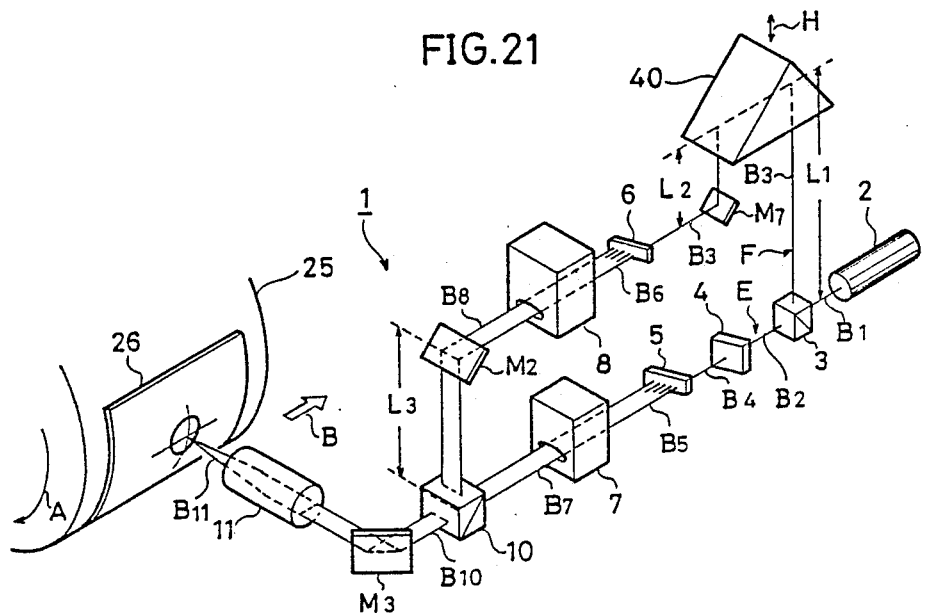
FIG. 21 is a perspective view of a laser exposure apparatus utilizing laser beams with the optical path difference wider than the coherence length.

The basic structure of the laser exposure apparatus 1 in accordance with the second embodiment comprises, as shown in FIG. 21, a laser light source 2, a beamsplitter 3, a beam shifter 4, a multitype beamsplitters 5·6, multichannel type light modulators 7·8, a right-angle prism 40, a beam synthesizer 10 and a beam reducing optical system 11. It is structured such that a serial beam spot line B12 such as shown in FIG. 6 is formed in the axial direction of the recording drum 25. The beam spot line B12 is formed by alternating beam spots of the beam B7 and the beam B8 as in the above described embodiment. M7 denotes a mirror.

The said right-angle prism 40 is provided in a detour light path F to adjust the optical path difference L between a straight light path E and the detour light path F to be a desired distance which is than the coherence length. The optical path difference L is approximately the same as the sum of L1, L2 and L3 shown in FIG. 21, and the optical path difference L can be adjusted by moving the right-angle prism 40 in the direction of the arrow H. The coherence length can be represented by the following equation (II), which is, in general, about 10 cm in the case of He-Ne laser and several cm in the case of Ar laser.

$$l = \frac{c}{\Delta \nu} \tag{II}$$

where
l: coherence length
Δν: line width
c: light velocity

Figure 22:
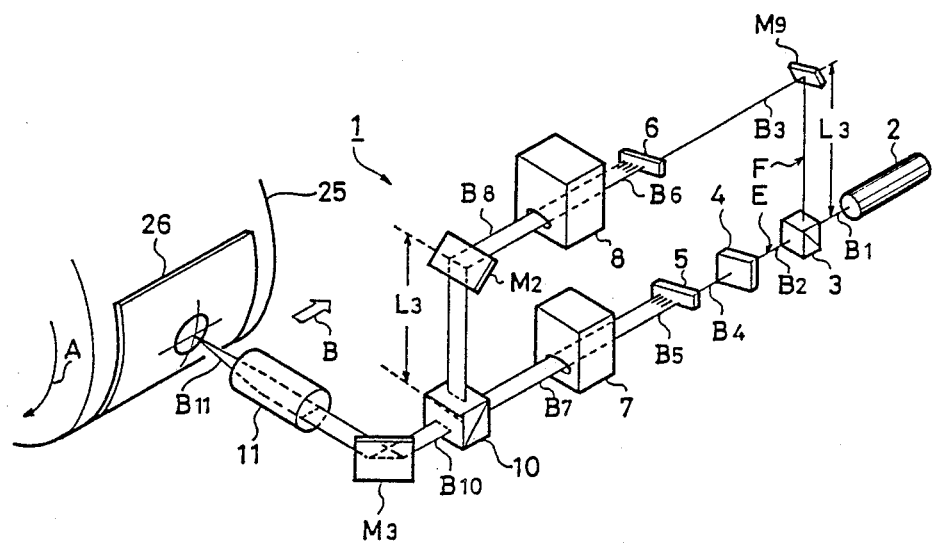
FIG. 22 is a modification of the embodiment shown in FIG. 21.

If the optical difference L is twice the length of L3 and is longer than the coherence length, the prism can be omitted and the position of the mirror M9 may be adusted such that the beam path is changed from F to B3 as shown in FIG. 22.

According to the above described structure, interference can be eliminated by providing an optical path difference L longer which is than the coherence length between adjacent recording beams. Thus, adjacent recording beams can overlap each other.

In the apparatus shown in FIG. 21, a plurality of mirrors may be used instead of the right-angle prism 40 to provide the optical path difference L.

Alternately, either one of the light paths E and F can be further divided to form a total of three light paths. When each of the three light paths have differences of length which are longer than the coherence length, then they may overlap each other without interference.

Embodiment 3

Figure 23:
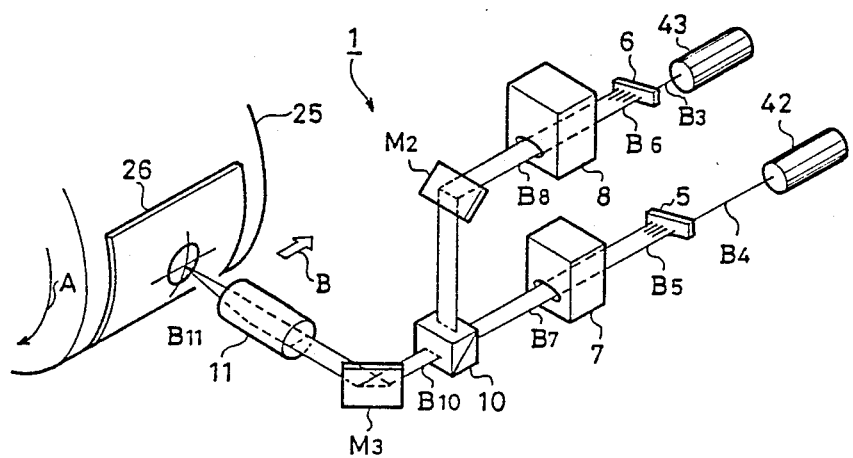
FIG. 23 is a perspective view of a laser exposure apparatus utilizing two separate laser beams.

In a third embodiment of the present invention, an apparatus utilizes laser beams from separate laser light sources. Description of features which are the same as or which correspond to portions of the above described apparatuses will be omitted appropriately. The laser exposure apparatus 1 in accordance with the third embodiment comprises, as shown in FIG. 23, two laser light sources 42-43, multitype beamsplitters 5-6, multichannel type light modulators 7-8, a beam synthesizer 10, and a beam reducing optical system 11. The third embodiment is structured such that a serial beam spot line B12 such as shown in FIG. 7 is formed in the axial direction of the recording drum 25. As in the apparatuses in the above described embodiments, the beam spot line B12 is formed by alternately arranging beam spots from the beams B7 and B8.

According to the above described structure, the adjacent recording beams are emitted from separate laser light sources. Therefore, there will be no interference. Consequently, adjacent recording beams can be overlapped with each other.

Figure 3:
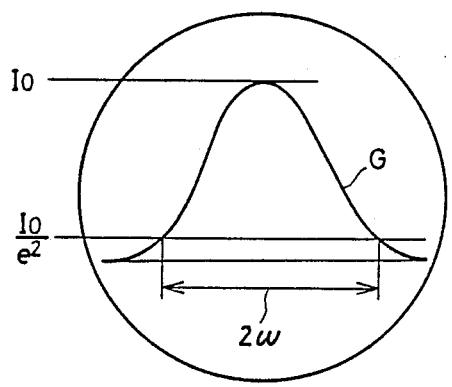
FIG. 3 shows an intensity distribution of the laser beam.
Figure 4:
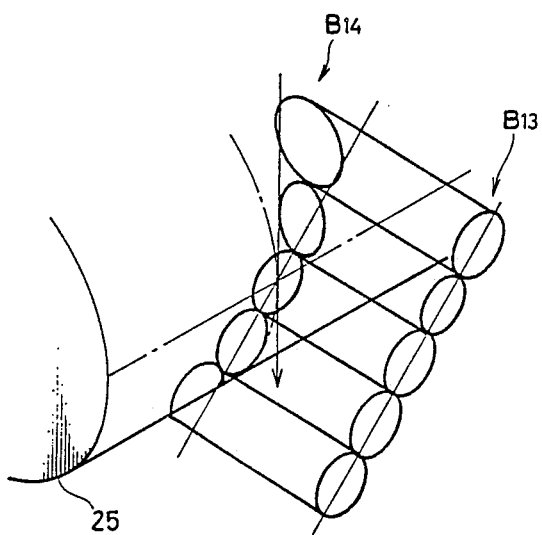
FIG. 4 shows an improved laser exposure recording method of the prior art.
Figure 24:
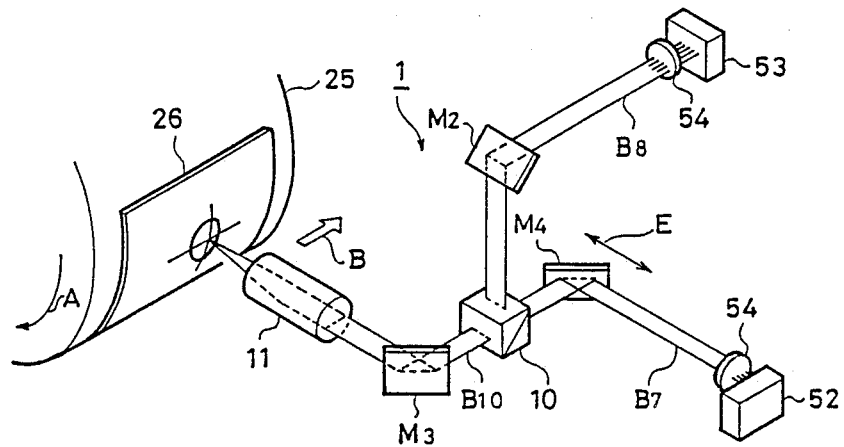
FIG. 24 is a modification of the embodiment shown in FIG. 23.

FIG. 24 shows a still further embodiment. The apparatus of this embodiment is different from the above described apparatus as follows; Arrayed laser diodes 52-53 having a plurality of exit edges are employed instead of the laser light sources 42-43 and the multitype beamsplitters 5-6 shown in Fig. 23. Furthermore, a mirror M4 is provided. The mirror can be adjusted in the direction of the arrow E. As is well known, the laser diode itself has a modulation function, so that the multichannel type light modulators 7-8 shown in FIG. 3 can be omitted in this apparatus. The numeral 54 denotes a collimator lens.

A polarizing beamsplitter is preferably used as the beam synthesizer 10 shown in FIGS. 23 and 24 as in the embodiments shown in FIGS. 6, 13 to 15 and 19. Energy loss can be minimized by using such a polarizing beamsplitter.

Figure 25:
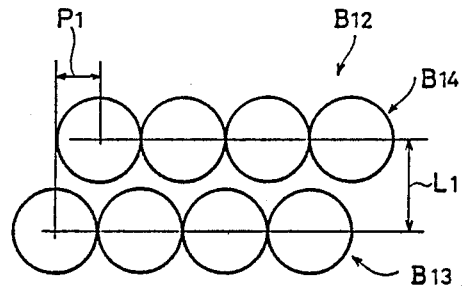
FIG. 25 shows a staggered arrangement of beam spot lines.

In all of the embodiments, the serial beam spot line B12 is formed by aligning each of the beam spots in a line. For example, in the apparatus shown in FIG. 6, a beamsplitter, a polarizing beamsplitter, a half mirror and the like are used as the beam synthesizer 10. The beam synthesizer 10 may be moved in the direction of the arrow E to provide a staggered beam spot line B12 such as shown in FIG. 25.

The beam spot line B12 with a staggered arrangement comprises a front spot line B14 positioned forward in the scanning direction (the direction of the arrow A) and a rear spot line B13 positioned behind the front spot line B14. The recording beam lines B7 and B8 are respectively emitted as a staggered recording beam line B10 through the beam synthesizing means 10 to form two spot lines.

The rear spot line B13 is spaced apart from the forward spot line B14 by a required interval L1 to avoid overlapping with the forward spot line B14. The spot lines B13 and B14 are shifted from each other by a prescribed pitch $P_1$ (in this case one half of the spot diameter D) in the subscanning direction (arrow B).

Figure 26:
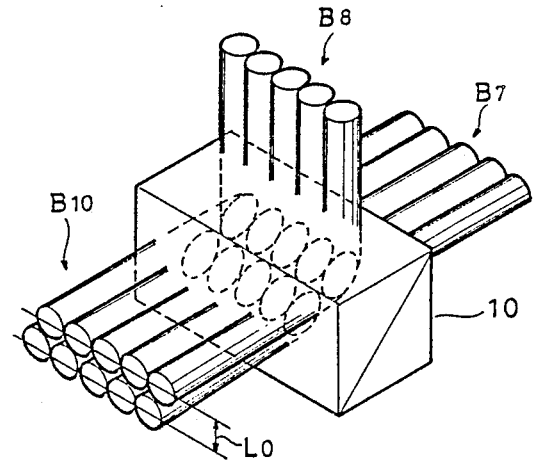
FIG. 26 shows the process of forming the staggered arrangement of the recording beam lines.

The interval L1 is selected by adjusting the interval L0 shown in FIG. 26 moving the beam synthesizing means 10 or the mirror M2 in the direction of the arrow E shown in FIG. 6.

In this structure, the front spot line B14 and the rear spot line B13 shown in FIG. 25 do not overlay with each other. Therefore, even if the half-wave retardation plate 9 of FIG. 6 is omitted, there will be no interference. In addition, if the half-wave retardation plate 9 is used and a polarizing beamsplitter is used as energy beam synthesizing means 10, then the loss can be minimized. In this case, even if the front spot line B14 and the rear spot line B13 overlap each other, there will be no interference of the laser beams. Therefore, the interval L1 in FIG. 25 can be made smaller. The staggered arrangement of the beam spot lines can be applied not only to the apparatus of the embodiment shown in FIG. 6 but also to the apparatuses of other embodiments.

The present invention is not limited to the above described various embodiments but is applicable with various modifications.

For example, in the above described embodiments, recording may be carried out by two beams without using the multitype beamsplitters 5-6.

In the above embodiments, recording is carried out on a photosensitive film attached to a recording drum. The present invention can be applied to apparatuses in which other photosensitive materials are used as recording media.

The above described embodiments, include a rotary recording drum and scanning and exposure is carried out by rotating the recording drum. However, as shown in the Patent Laying-Open Gazette No. 67277/1981, the present invention may be applied to flying spot systems in which a laser beam is reciprocated across a recording medium by means of a rotary polygon mirror, galvano mirror, or the like.

According to the present invetion, recording can be carried out using adjacent beams without interference. Portions of the recording beams can be overlapped with each other to form a beam spot line oriented in a direction which is orthogonal to the main scanning direction. Consequently, a laser exposure apparatus can be provided which is capable of forming a uniformly dense recording pattern.

Although the present invention has been described and illustrated in detail, it is clearly understood that the same is by way of illustration and example only and is not to be taken by way of limitation. The scope of the present invention should be limited only by the terms of the appended claims.

What is claimed is:

1. An apparatus for exposing a recording medium, comprising:
   means for forming laser beams, said forming means including a single source of laser light for forming a source beam, and means for splitting said source beam into said laser beam;
   means for independently modulating said laser beams;

means for synthesizing said laser beams to form a synthesized beam, said synthesizing means includes means for synthesizing said laser beams so that portions thereof overlap each other;

an optical system for projecting said synthesized beam onto a recording medium to form a line; and means for polarizing said laser beams so that said laser beams are orthogonally polarized with respect to each other.

2. An apparatus according to claim 1, wherein said polarizing means includes means for converting said laser beams into a pair of linearly polarized beams.

3. An apparatus according to claim 2, wherein said converting means includes a half-wave retardation plate.

4. An apparatus according to claim 1, wherein said polarizing means includes means for converting said laser beams into a pair of circularly polarized beams.

5. An apparatus according to claim 4, wherein said converting means includes a quarter-wave retardation plate.

6. An apparatus according to claim 1, wherein said polarizing means includes means for converting said laser beams into a pair of elliptically polarized beams.

7. An apparatus according to claim 1, wherein said modulating means includes a multichannel-type light modulator.

8. An apparatus according to claim 1, wherein said synthesizing means includes a polarizing beamsplitter.

9. An apparatus for exposing a recording medium, comprising:

means for forming laser beams, said forming means including a single source of laser light for forming a source beam, means for splitting said source beam into said laser beams, and means for defining a first optical path and a second optical path, said optical paths having different lengths, the difference between said lengths being longer than the coherence length of said laser beams;

means for independently modulating said laser beams;

means for synthesizing said laser beams to form a synthesized beam; and an optical system for projecting said synthesized beam onto a recording medium to form a line.

10. An apparatus according to claim 9, wherein said defining means includes a right-angle prism.

11. An apparatus according to claim 9, wherein said defining means includes a mirror.

12. A method of exposing a recording medium to form an image, comprising the steps of:

forming two laser beams; said forming step including the steps of providing a single laser light source, irradiating a source beam from said sourse, splitting said irradiated source beam into said laser beams, and polarizing said laser beams so that said beams are orthogonally polarized with respect to each other;

independently moduating said laser beams; and projecting said modulated laser beams in an overlapping manner onto a recording medium.

13. A method according to claim 12, wherein:

said orthogonally polarized laser beams orthogonally intersect each other;

said method further includes a step of providing a beamspitter in the paths of said laser beams; and said aligning step includes the step of aligning by means of said beamsplitter.

14. A method according to claim 13, wherein said modulating step includes the step of modulating by means of a multichannel type light modulator.

15. A method according to claim 12, wherein said polarizing step includes the step of converting said laser beams into linearly polarized beams.

16. A method according to claim 12, wherein said polarizing step includes the step of converting said laser beams into circularly polarized beams.

17. A method according to claim 12, wherein said polarizing step includes the step of converting said laser beams into elliptically polarized beams.

18. A method of exposing a recording medium to form an image, comprising the steps of:

forming two laser beams; said forming step includes the steps of providing a single laser light source, inrradiating a source beam from said source, splitting said irradiated source beam into said laser beams, and defining two optical paths which have a difference in length which is longer than the coherence length of said laser beams;

independently modulating said laser beams; and projecting said modulated laser beams in an overlapping manner onto a recording medium.

19. A method according to claim 18, wherein said forming step includes the step of passing one of said laser beams through a prism.

20. A method according to claim 18, whereing said defining step includes the step of causing one of said laser beams to travel along a detour path by means of a mirror.

21. A method according to claim 12, wherein said modulated laser beams are projected onto said recording medium to form a line and wherein said method further includes the step of scanning said laser beams across said recording medium in a direction orthogonal to said line.

22. Apparatus for forming a line, comprising:

first and second arrayed laser diodes different from each other and each having a respective plurality of light emitting edges and a modulation function for modulating laser light emitted therefrom;

a synthesizing means including a polarized beamsplitter for synthesizing laser beams emitted from said first and second arrayed laser diodes;

said synthesizing means synthesizing said laser beams in a staggered arrangement to form a plurality of staggered beam spot lines; and an optical system for projecting said synthesized beam onto a recording medium to form a line.

23. A method of exposing a recording medium, comprising the steps of:

providing a first laser beam from a first laser source;

splitting said first laser beam into a plurality of laser beams and modulating independently said plurality of laser beams;

providing a second laser beam from a second laser source different from said first laser source;

splitting said second laser beam into a plurality of laser beams and modulating independently said foregoing plurality of laser beams;

synthesizing said first and second modulated beams in a staggered arrangement to form a plurality of staggered beam spot lines; and projecting said synthesized beams onto a recording medium to form a line;

said step of sythesizing including the step of using a polarized beamsplitter.

24. A method for forming a line, comprising the steps of:
   synthesizing laser beams emitted from first and second arrayed laser diodes that are different from each other and that each have a respective plurality of light emitting edges and a modulation function for modulating laser light emitted therefrom;
   synthesizing said laser beams in a staggered arrangement to form a plurality of staggered beam spot lines; and
   projecting said synthesized beam onto a recording medium to form a line;
   said step of synthesizing including the step of using a polarized beamsplitter.

25. An apparatus according to claim 9, further including means for scanning said snythesized beam across said recording medium in a direction which is orthogonal to said line.

26. An apparatus for exposing a recording medium, comprising:
   means for forming laser beams;
   means for independently modulating said laser beams;
   means for synthesizing said laser beams to form a synthesized beam, said synthesizing means including means for synthesizing said laser beams in a staggered arrangement to form a plurality of staggered beam spot lines;
   an optical system for projecting said synthesized beam onto a recording medium to form a line;
   each of said laser beams including a plurality of component laser beams; and
   means for directing said component laser beams toward said synthesizing means from different directions; and
   means for scanning said synthesized beam across said recording medium in a direction which is orthogonal to said line.

27. A method according to claim 18, wherein said modulated laser beams are projected onto said recording medium to form a line and wherein said method further includes the step of scanning said laser beams across said recording medium in a direction orthogonal to said line.

28. A method of exposing a recording medium, comprising the steps of:
   providing a first laser beam from a first laser source;
   splitting said first laser beam into a plurality of laser beams and modulating independently said plurality of laser beams;
   providing a second laser beam from a second laser source different from said first laser source;
   splitting said second laser beam into a plurality of laser beams and modulating independently said foregoing plurality of laser beams;
   synthesizing said first and second modulated beams in a staggered arrangement to form a plurality of staggered beam spot lines;
   projecting said synthesized beams onto a recording medium to form a line;
   projecting said modulated laser beams onto said recording medium to form a line; and
   scanning said laser beams across said recording medium in a direction orthogonal to said line.

29. A method for forming a line, comprising the steps of:
   synthesizing laser beams emitted from first and second arrayed laser diodes that are different from each other and that each have a respective plurality of light emitting edges and a modulation function for modulating laser light emitted therefrom;
   synthesizing said laser beams in a staggered arrangement to form a plurality of staggered beam spot lines projecting said synthesized beam onto a recording medium to form a line;
   projecting said modulated laser beams onto said recording medium to form a line; and
   scanning said laser beams across said recording medium in a direction orthogonal to said line.

30. A method of exposing a recording medium, comprising the steps of:
   forming laser beams each of which includes a plirality of component laser beams oriented in different directions;
   independently modulating said laser beams and projected said modulated laser beams onto said recording medium to form a line; synthesizing said laser beams to form a synthesized beam, said step of synthesizing including the step of synthesizing said laser beams in a staggered arrangement to form a plurality of staggered beam spot lines;
   projecting said synthesized beam onto a recording medium to form a line; and
   scanning said laser beams across said recording medium in a direction orthogonal to said line.

31. An apparatus according to claim 26, whereing said synthesizing means includes a polarizing beamsplitter.

32. An apparatus according to claim 1, further including means for scanning said synthesized beam across said recording medium in a direction which is orthogonal to said line.

* * * * *